US012784542B2

(12) United States Patent
Alvarez et al.

(10) Patent No.: US 12,784,542 B2
(45) Date of Patent: Nov. 3, 2026

(54) PHYSICAL CRYPTOGRAPHIC TOKENS FOR A WAGERING GAME

(71) Applicant: IGT, Las Vegas, NV (US)

(72) Inventors: Jackie Alvarez, Las Vegas, NV (US); David Small, Moncton (CA); Todd Grimm, Riverview (CA); Daniel Landry, Moncton (CA); Bethany Plimmer, Lower Coverdale (CA); Gaurav Jariwala, Halifax (CA); David Froy, Lakeville-Westmorland (CA); Karen Van Niekerk, Dieppe (CA); Aaron Corey, Moncton (CA); Anthony Baerlocher, Henderson, NV (US)

(73) Assignee: IGT, Las Vegas, NV (US)

( * ) Notice: Subject to any disclaimer, the term of this patent is extended or adjusted under 35 U.S.C. 154(b) by 224 days.

(21) Appl. No.: 18/677,338

(22) Filed: May 29, 2024

(65) Prior Publication Data

US 2025/0371940 A1 Dec. 4, 2025

(51) Int. Cl.
*G07F 17/32* (2006.01)

(52) U.S. Cl.
CPC ........ *G07F 17/3251* (2013.01); *G07F 17/329* (2013.01)

(58) Field of Classification Search
CPC ........................... G07F 17/3251; G07F 17/329
See application file for complete search history.

(56) References Cited

U.S. PATENT DOCUMENTS

| | | | | |
|---|---|---|---|---|
| 6,629,591 | B1 | 10/2003 | Griswold et al. | |
| 9,024,719 | B1 * | 5/2015 | Saunders | G06Q 20/3278 235/382 |
| 2008/0046747 | A1 * | 2/2008 | Brown | G06Q 30/06 713/182 |
| 2009/0011821 | A1 * | 1/2009 | Griswold | G07F 17/3206 463/25 |
| 2013/0244771 | A1 * | 9/2013 | Hafezi | G07F 17/3241 463/29 |
| 2014/0002238 | A1 * | 1/2014 | Taveau | G07C 9/257 340/5.53 |
| 2014/0215218 | A1 * | 7/2014 | Brands | H04L 9/3234 713/172 |
| 2017/0046548 | A1 * | 2/2017 | Kamijo | G06K 7/1417 |
| 2018/0322501 | A1 * | 11/2018 | Eisen | G06Q 20/34 |
| 2019/0058591 | A1 * | 2/2019 | Sharpe | G06Q 20/38215 |
| 2023/0085677 | A1 | 3/2023 | Copeland et al. | |
| 2024/0291659 | A1 * | 8/2024 | Ward | H04L 9/3218 |

* cited by examiner

*Primary Examiner* — James S. McClellan
(74) *Attorney, Agent, or Firm* — Spencer Fane LLP; William M. Kelly

(57) ABSTRACT

A physical cryptographic token may include a substrate and a passive identifier device for passively providing a token identifier associated with the cryptographic token to a token authentication device. A cryptographic token management device may include a token authentication device for receiving token identifier from a passive identifier device of a physical cryptographic token, a token management interface for managing cryptographic tokens associated with token identifiers of physical cryptographic tokens, and a token dispenser device for dispensing a physical cryptographic token associated with a token identifier.

19 Claims, 10 Drawing Sheets

PHYSICAL CRYPTOGRAPHIC TOKENS FOR A WAGERING GAME

BACKGROUND

Embodiments described herein relate to cryptographic tokens, and in particular to physical cryptographic tokens for a wagering game in a gaming environment, such as in a casino environment, and related devices, systems, and methods. Some wagering games, such as slot games and/or video poker games provided at Electronic Gaming Machines (EGMs) and/or mechanical gaming devices in a casino environment, may include unique game features associated with cryptographic tokens as an additional incentive for play of a wagering game. There is a need for providing additional options for player interaction and enjoyment to encourage wagering game play.

BRIEF SUMMARY

According to some embodiments, a physical cryptographic token includes a substrate. The physical cryptographic token further includes a passive identifier device for passively providing a token identifier associated with the cryptographic token to a token authentication device.

According to some embodiments, a cryptographic token management device includes a token authentication device for receiving token identifier from a passive identifier device of a physical cryptographic token. The cryptographic token management device further includes a token management interface for managing cryptographic tokens associated with token identifiers of physical cryptographic tokens. The cryptographic token management device further includes a token dispenser device for dispensing a physical cryptographic token associated with a token identifier.

DETAILED DESCRIPTION

Figure 1:
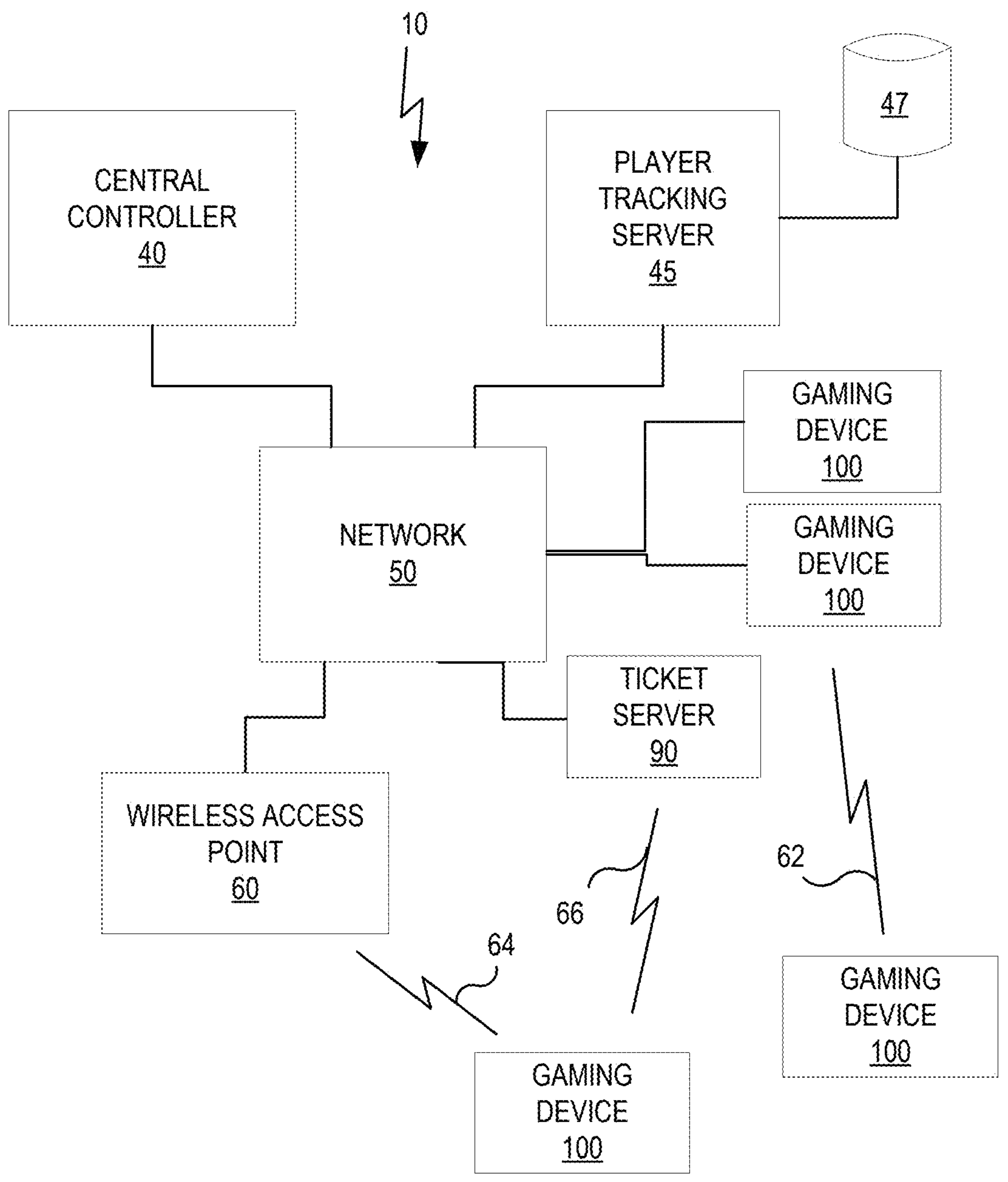
FIG. 1 is a schematic block diagram illustrating a network configuration for a plurality of gaming devices according to some embodiments.

Embodiments described herein relate to cryptographic tokens, and in particular to physical cryptographic tokens for a wagering game in a gaming environment, such as in a casino environment, and related devices, systems, and methods. In some embodiments, cryptographic tokens may be redeemable as game features or side games for a wagering game. For example, the game features may be accessed as part of a play session at a dedicated gaming device, such as an EGM, sports betting kiosk, etc., or may be accessed in an independent gaming environment, such as a mobile phone, tablet, or other player device.

In some examples, physical tokens may be provided as collectible items. One benefit of providing physical tokens is to provide a broader appeal to a wider audience as a tangible item, which may instill a greater sense of ownership than an intangible asset such as a conventional cryptographic token, with greater perceived value and uniqueness. In some examples, properties of the physical tokens can also be transferred to a software application, such as an online wagering game or EGM software, which may provide in-game benefits for example.

Many casino players may not perceive significant value in intangible cryptographic tokens, and it may be more difficult in a physical setting to display the token or a representation of the token to other players, e.g., as a status identifier. In some examples, a physical token associated with an intangible cryptographic token may be mechanically connected to an EGM or other land-based game and can communicate with the game. Physical tokens that are attached to an EGM or table game can be seen by the player and by others in the casino and can provide a sense of pride, status, ownership, etc. to the player. A smart physical token can be empowered with functionality as a fully digital cryptographic token, while adding additional benefits not available with the intangible token.

The form factor and appearance of the physical token, such as a casino chip, game character, animal, etc., can vary as desired, and can be created using various materials and techniques. For example, additive printing techniques, such as 3D printing can use various materials to achieve specific appearances, and can also be customized by players, such as via a player-accessible token management interface.

The physical tokens may include passive technologies such as Radio Frequency ID (RFID), three dimensional Quick Response (3D QR) codes, standard QR codes, etc., which generate unique physical tokens at low cost. In some examples, the tokens will not contain a dedicated processor circuit, and may instead leverage the processor circuits of connected devices, such as EGMs mobile computing devices, and/or token management kiosks. In some examples, the token may store minimal information, such as a token identifier associated with a cryptographic, with attributes of the associated cryptographic token being stored in the associated blockchain, which may be distributed across any number of computing devices, which may manage and execute any interactions and/or transactions between and among different tokens.

In some examples, a 3D QR code may provide a low-cost robust option for providing a secure identification method for the physical cryptographic token. In some examples, the code may be a unique 3D structure that is 3D printed as part of the physical token, or which may be separately 3D printed and then permanently attached to the 3D token. The unique code may be read by a muti-touch sensitive surface where the shape of the code is detected by the surface and translated to the unique ID associated with the cryptographic token. In some examples, two-factor authentication may be used to provide an additional layer of security to prevent unauthorized access, use, or duplication of the physical token. In some examples, the physical token may include additional moving parts and/or electromechanical devices, such as LED and/or audio components. In some examples, portions of the 3D QR code may protrude from the substrate in a z-direction, and/or may be inlaid or recessed in the substrate in the z-direction. In some examples, the 3D QR Code may be designed to mate with, i.e., fit, a complementary 3D pattern in another physical token, reader device, or other object, such as another complementary QR code. In some examples certain functions of the token may only function when mated with a complementary token or other embedded 3D pattern. In some examples, a sensor may be capable detecting height and/or depth variations of different portions of the 3D QR code, thereby allowing for more complex codes and the encoding and embedding of more data therein.

In some examples, a mobile computing device, such as a smart phone, may replicate the physical token to create a digital twin, e.g., by taking a picture of a physical token, and may also transfer properties and features available on the physical token to the digital twin, which may enable the token to be used in both physical venues and online/virtual venues.

A system that resides on a management kiosk, an EGM, or other device may detect and determine the unique IDs of the tokens and access system stored memory for each token to enable the token functionality, which may include persistence, enhanced game play features and other features, as desired.

In some examples, the physical tokens may include physical trading cards, which may be issued periodically (e.g., monthly or yearly, with limited access), that are each associated with a unique cryptographic token that can be used in casinos or online venues in connection with wagering games, for example. In some examples, the trading cards may be collectible and tradable, with varying ranges of features and values. In some examples, a casino could issue specific game character cards with levels of game play on a specific game to increase demand for the particular game.

In some examples, a token may include a scratch off components, where the token identifier is printed on a substrate behind a scratch off layer. In some examples, the identifier may be printed on a substrate using encoded ink, which can be detected by a touchscreen or other sensor device to tie the cryptographic token to the device.

In some examples, a player may utilize a management interface to customize a token's appearance. For example, a token management kiosk may include a 3D printer that can create or modify tokens based on specific games and/or player input. In some examples, the player can apply funds during a cashout operation to purchase and/or modify a physical token. The 3D printer can also create enhancements that can be added to a basic token. These enhancements can also trigger additional token features and functionality, thereby making the token more valuable. In some examples, different premium materials can be used, e.g., for more valuable tokens.

In some examples, tokens can be used to market new games' characters to initiate the player's familiarity with the game. Token sets from different games with all the game characters can be created to encourage players to collect a complete set. The player can be awarded different features or additional functionality when they have the entire set. Tokens may be incorporated into wearable items, such as pin, which can be worn by the player on clothing or accessories, and can also communicate with the gaming device via RFID or 3D QR code.

In some examples, a player loyalty card may be associated with a cryptographic token, which may provide perks or benefits while playing. These perks and features can be collected or purchased, such as purchasing the right to a more favorable paytable for a period of time. In some examples, a casino can offer a menu of different tokens at different prices, which are associated with specific unique benefits like comped meals, entry to clubs, spa services, etc. Tokens can be transferrable and resold, creating a secondary market for the physical tokens.

In some examples, tokens may be used to enable persistence, e.g., retaining play history and game progress. In some examples, connecting the token to an EGM may cause the EGM to change appearance, e.g. to identify that a specific token and/or benefit is being used.

In some examples, larger tokens may be used for large wins, where the casino and/or player may take a picture of the player with the token for marketing and memento purposes. In some examples, the token may include digital wallet hardware to store other cryptographic tokens, cryptocurrency, etc.

Before describing these and other features in greater detail, reference is now made to FIG. 1, which illustrates a gaming system 10 including a plurality of gaming devices 100. The gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link, e.g., via the Internet and/or an intranet, as desired. The network 50 may connect to a locally hosted server, a remote hosted cloud-based server, and/or other types of servers. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
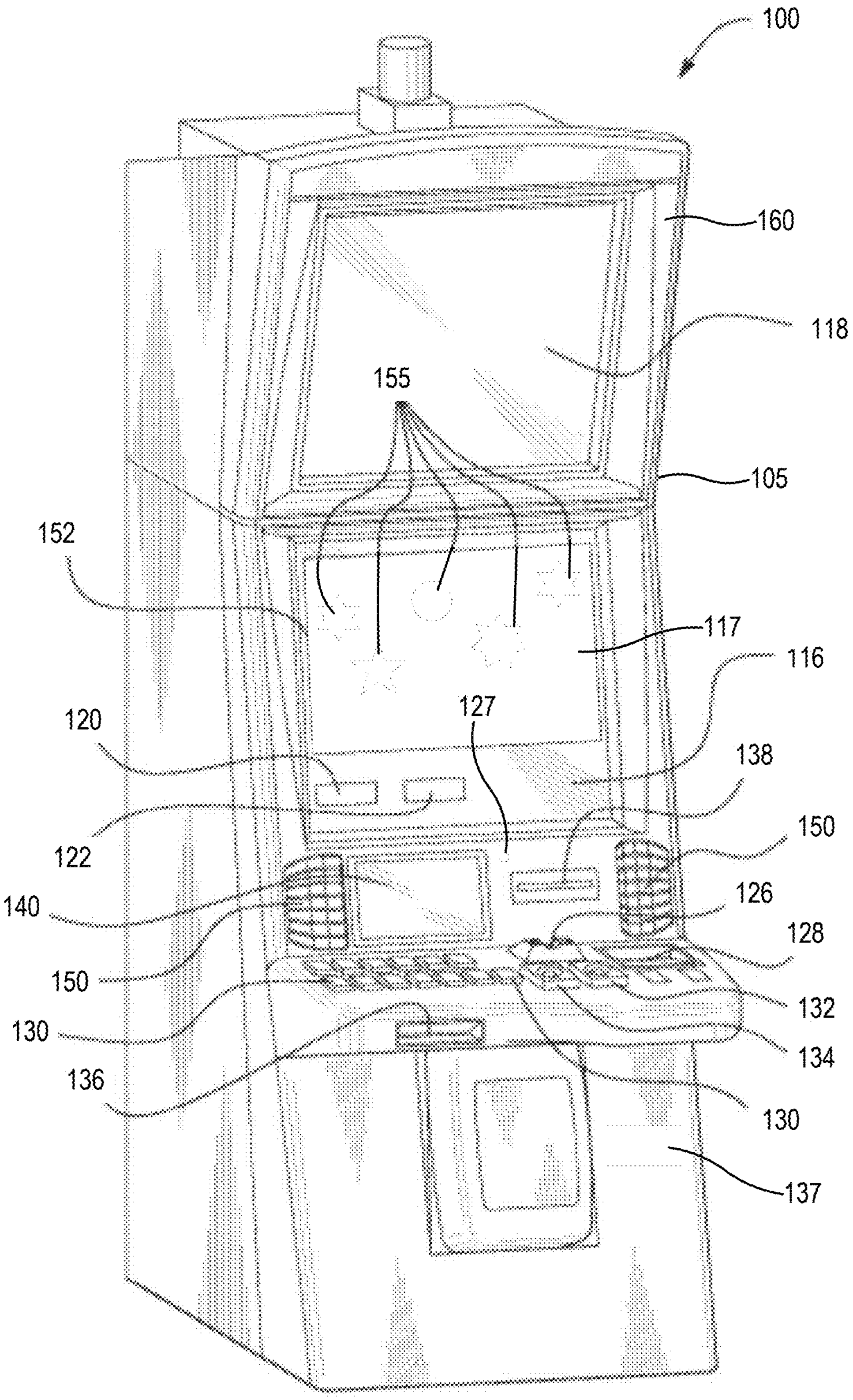
FIG. 2A is a perspective view of a gaming device that can be configured according to some embodiments.
Figure 2B:
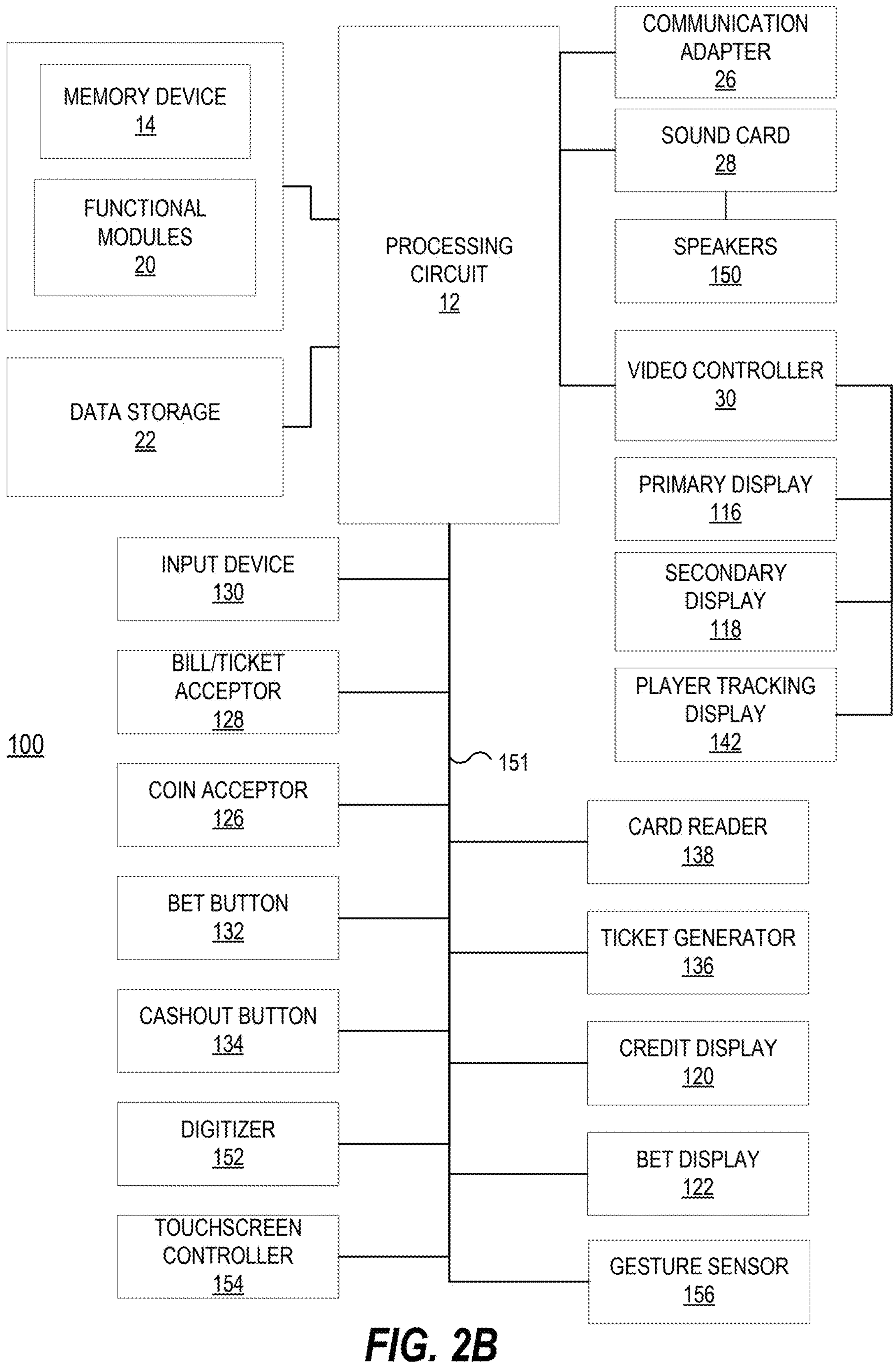
FIG. 2B is a schematic block diagram illustrating an electronic configuration for a gaming device according to some embodiments.
Figure 2C:
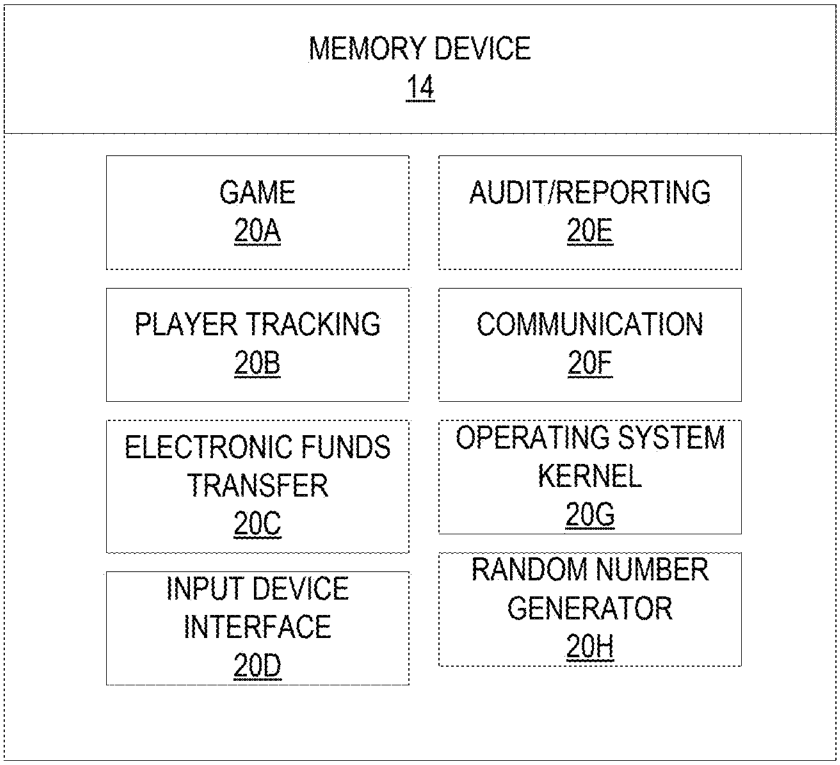
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processing circuit 12 that controls operations of the gaming device 100. Although illustrated as a single processing circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as optical code reading sensors, eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
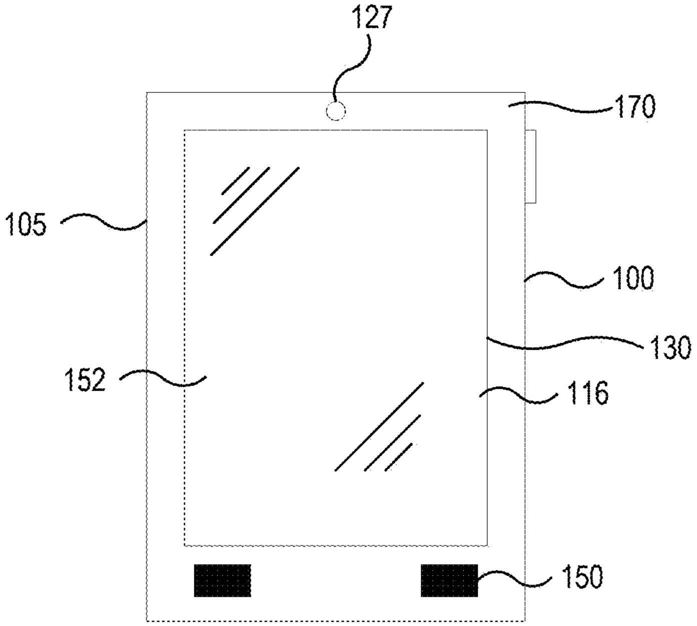
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. One or more input devices 130 may be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
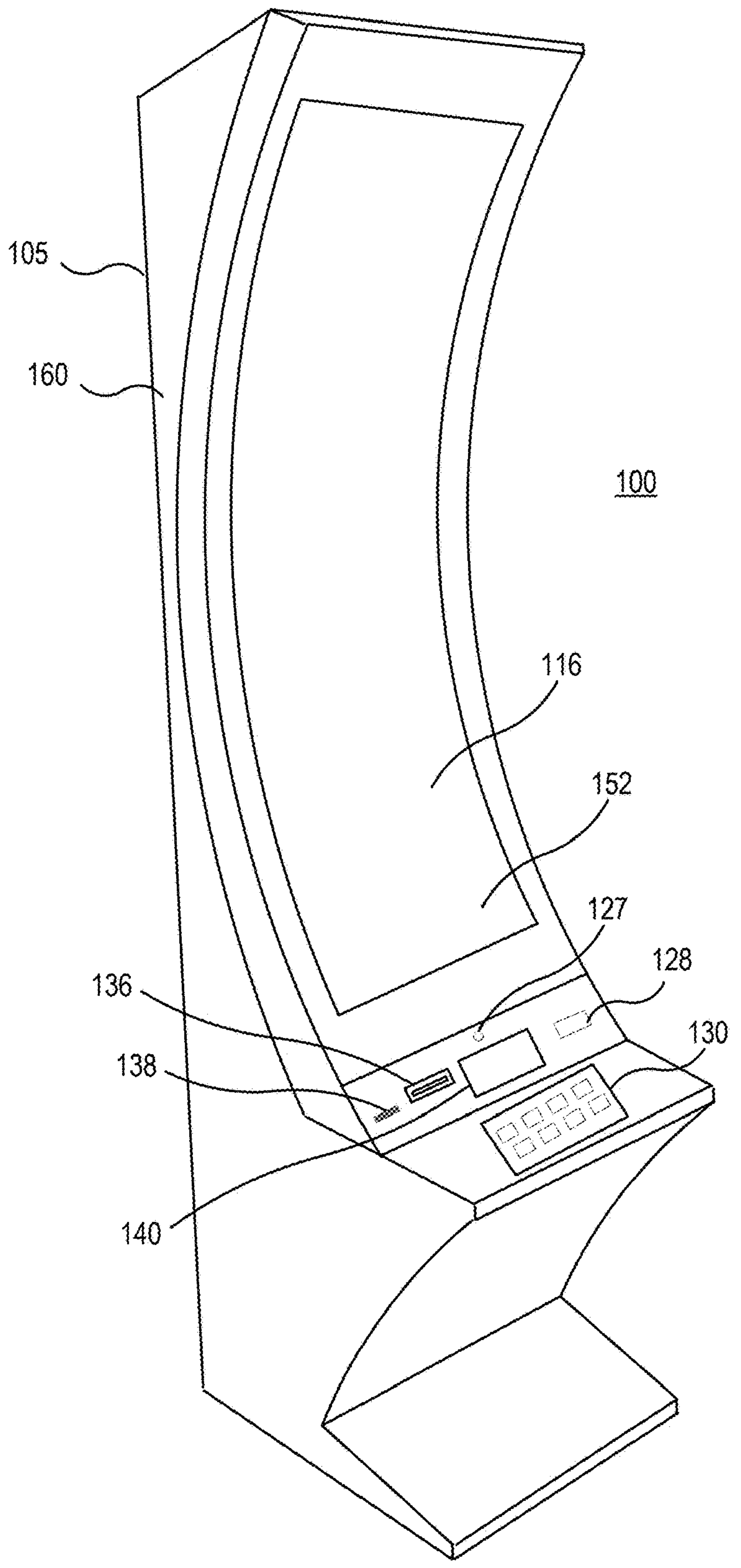
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as electronic gaming machines (EGMs) and mobile gaming devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3:
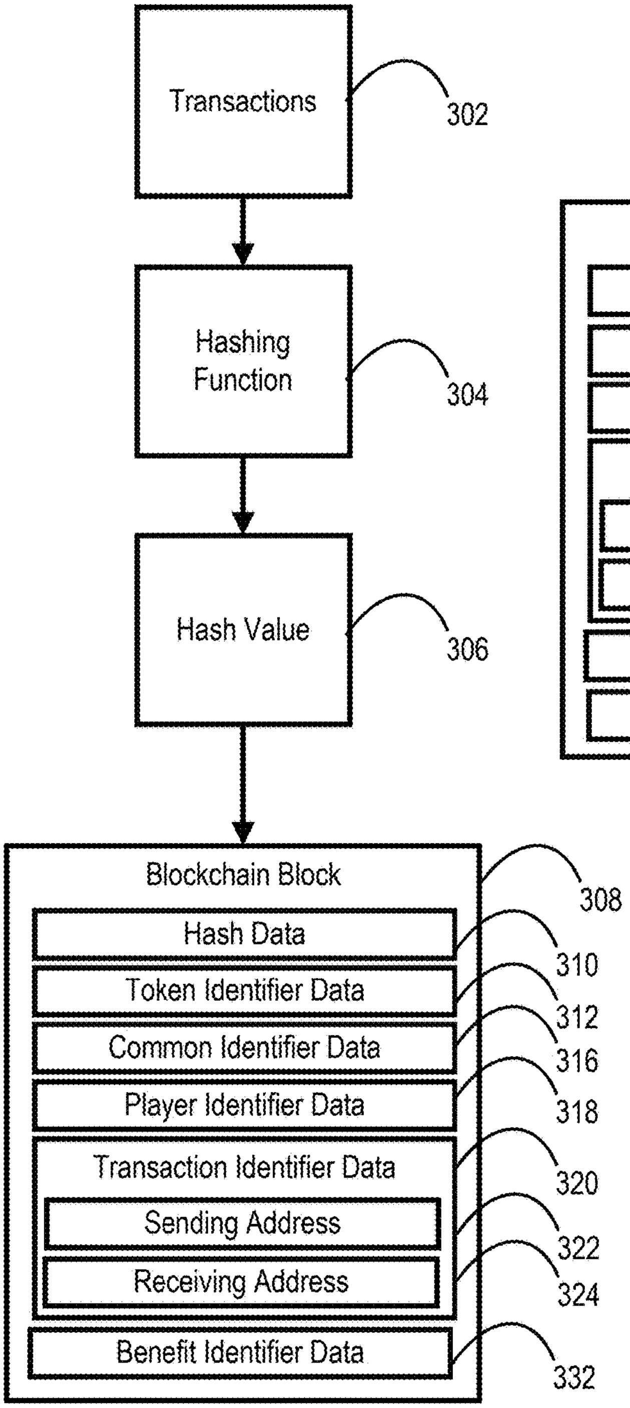
FIG. 3 is a schematic block diagram illustrating various operations for a blockchain token transaction according to some embodiments.

Referring now to FIG. 3, a schematic block diagram illustrates various operations for a blockchain transaction recordation according to some embodiments. As illustrated in FIG. 3, transactions 302 may occur at various blockchain nodes. In accordance with various embodiments, a hash may be created for each entry. For example, a cryptographic hash function may create a one-way, (essentially) collision free signature of the entry. The hash algorithm generates a hash. Using hashing function 304, hash values 306 of these transactions are created and added to blockchain blocks 308 that are in the blockchain data structure.

In this example, each blockchain block 308 may include one or more different types of data. For example, each blockchain block 308 may include cryptographic hash data 310 indicative of a result of the hashing function 304 associated with a common blockchain, token identifier data 312 indicative of an identity of a cryptographic token 314 associated with the block 308, common identifier data 316 indicative of the cryptographic token 314 being part of a plurality of cryptographic tokens, e.g., a defined subset of tokens based on different criteria, associated with the common blockchain, player identifier data 318 indicative of an identity of a player associated with the cryptographic token 314, transaction identifier data 320 associated with the unique transaction on the blockchain, which may include a sending address 322 associated with a provider of the cryptographic token 314 and a receiving address 324 associated with the player identifier data 318.

The cryptographic token 314 may include some or all of the data structure of the respective associated block 308 and/or may contain a block identifier 325 referring to the associated block 308, which allows the cryptographic token 314 to be securely and transparently authenticated against the blockchain. In some examples, the cryptographic token 314 may include a common identifier 326 corresponding to the common identifier data 316 and indicative of the cryptographic token 314 being part of the plurality of cryptographic tokens, and a player identifier 328 corresponding to the player identifier data 318 and indicative of a player associated with the cryptographic token 314. The cryptographic token 314 may include a unique transaction identifier 330 associated with a unique transaction on the blockchain, i.e., a unique block 308, and may include the sending address 322 and/or the receiving address 324.

For example, a new transaction for the cryptographic token may include transmitting a transaction indication of the new transaction including a sending address 322 and receiving address 324, and, based on the transaction indication, modifying the player identifier data 318 in a new block 308 and/or the player identifier 328 of the cryptographic token 314 to be indicative of a different player.

In some examples, each block 308 may further include benefit identifier data 332 associated with a game benefit being provided to the player associated with the cryptographic token 314. Alternatively or in addition, the cryptographic token 314 may include a benefit identifier 334 corresponding to the benefit and/or benefit identifier data 332. Each cryptographic token 314 may be a fungible token that is fungible with other cryptographic tokens, and/or may further include a unique identifier 336, which may correspond to the token identifier data 312 of the block 308, such that the cryptographic token 314 is a non-fungible token that is not fungible with other cryptographic tokens.

As a general principle, a validation process may be performed to ensure that each new blockchain block 308 meets the criteria for inclusion into the blockchain data structure. In a blockchain configuration, there are varying consensus algorithms that can be used. For example, a private blockchain may choose an algorithm such as Practical Byzantine Fault Tolerance (PBFT). The PBFT mechanism may be useful for small networks, such as networks having fewer than about 100 nodes. Other examples include a Proof of Work (PoW) consensus algorithm and/or a Proof of Stake (POS) consensus algorithm, which may be used as the value of an underlying data block and/or value changes.

Figure 4A:
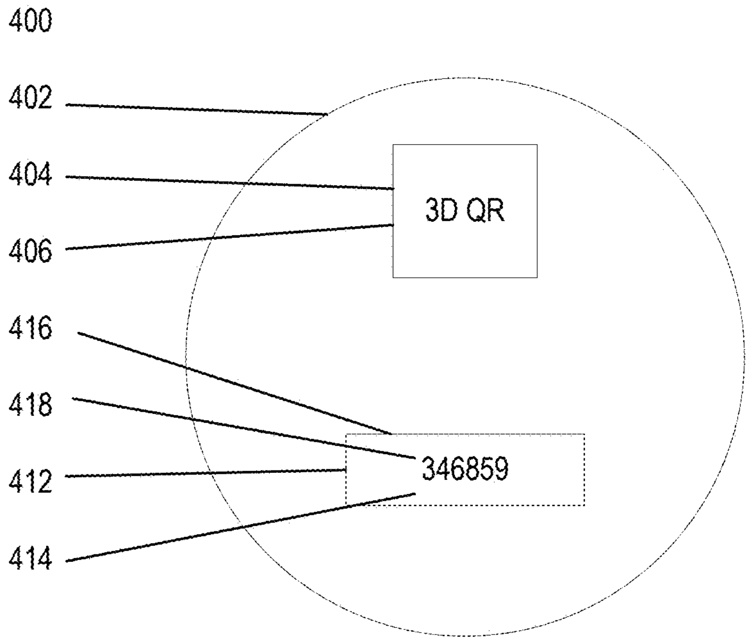
FIGS. 4A and 4B illustrates physical cryptographic tokens, according to some embodiments.
Figure 4B:
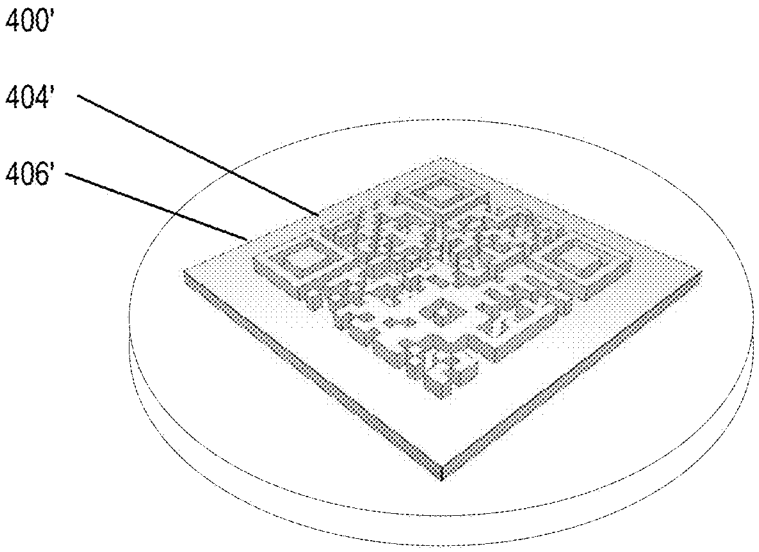

Referring now to FIG. 4A, a physical cryptographic token 400 is illustrated, according to some embodiments. The token 400 may include a substrate 402 and a passive identifier device 404 for passively providing a token identifier associated with the cryptographic token 400 to a token authentication device. In this example, the passive identifier device 404 include a three dimensional structure 406 comprising a machine readable three-dimensional code 408 (e.g., a 3D QR code 408' as shown in the token 400' and passive identifier device 404' of FIG. 4B). As will be described in greater detail with respect to FIG. 5, positioning the three dimensional structure 406 on a multi-touch sensor device of a token authentication device causes the token authentication device to read the three-dimensional code 408 and determine the token identifier based on the three-dimensional code 408. In this example, the substrate 402 and the three dimensional structure 406 are formed by an additive manufacturing process, e.g., by 3D printing.

In this example, the token 400 further includes a two-factor authentication device 410 for providing a visual indication 412 of a two-factor authentication code 414. In this example, the two-factor authentication device includes a display device 416, wherein the visual indication 412 comprises an alphanumeric code 418 displayed by the display device 416.

Figure 5:
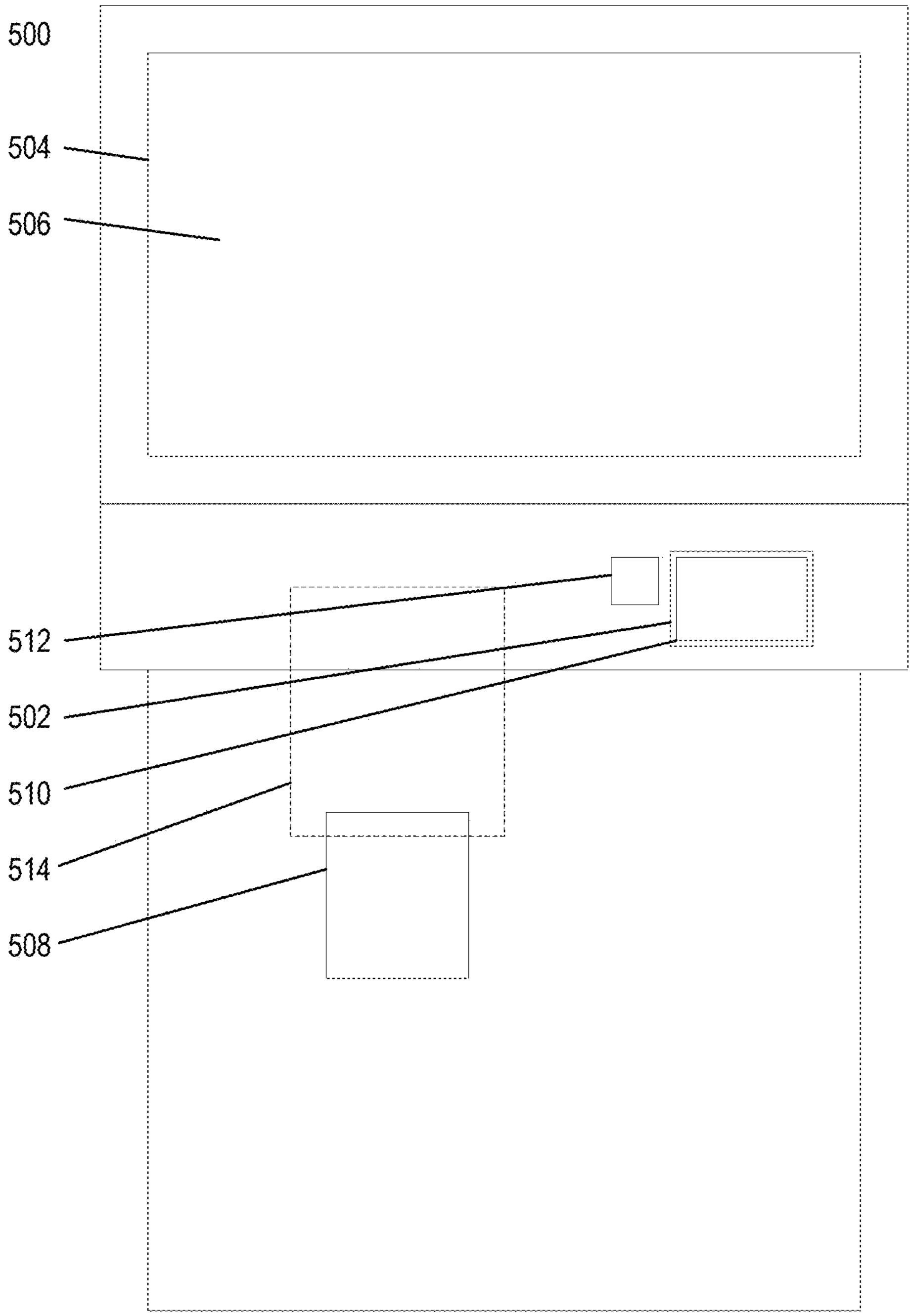
FIG. 5 illustrates cryptographic token management device for managing cryptographic tokens associated with token identifiers of physical cryptographic tokens, according to some embodiments.

Referring now to FIG. 5, a cryptographic token management device 500 for managing cryptographic tokens associated with token identifiers of physical cryptographic tokens is illustrated, according to some embodiments. The cryptographic token management device 500 may include a token authentication device 502 for receiving token identifier from a passive identifier device of a physical cryptographic token. In this example, the token authentication device 502 comprises a multi-touch sensor device 510 to detect a three dimensional structure of the physical cryptographic token positioned on the sensor device 510 and determine the token identifier based on the detected three-dimensional structure. Alternatively or in addition, the token authentication device 502 may include an optical sensor device 512 to detect a printed code on the physical cryptographic token and determine the token identifier based on the detected printed code. In some examples, the optical sensor device 512 may, alternatively or in addition, detect two-factor authentication information being displayed by the physical cryptographic token to authenticate the physical cryptographic token.

The cryptographic token management device 500 may further include a display device 504 including a token management interface 506 (e.g., a GUI) for managing cryptographic tokens associated with token identifiers of physical cryptographic tokens. In some examples, a processor circuit of the cryptographic token management device 500 may receive, via the token authentication device 502, a token identifier from a passive identifier device of a physical cryptographic token, determine, based on the token identifier, a cryptographic token associated with the physical cryptographic token, and execute a blockchain transaction based on the cryptographic token. The token management interface 506 may further include an input device to input two-factor authentication information obtained from the physical cryptographic token to authenticate the physical cryptographic token.

The cryptographic token management device 500 may further include a token dispenser device 508 for dispensing a physical cryptographic token associated with a token identifier. The token dispenser device 508 may include an additive printing device 514 to print the physical cryptographic token based on a token identifier associated with a cryptographic token. In some examples, printing the physical cryptographic token comprises printing a substrate and a three-dimensional structure comprising a machine readable three-dimensional code associated with the token identifier.

Figure 6:
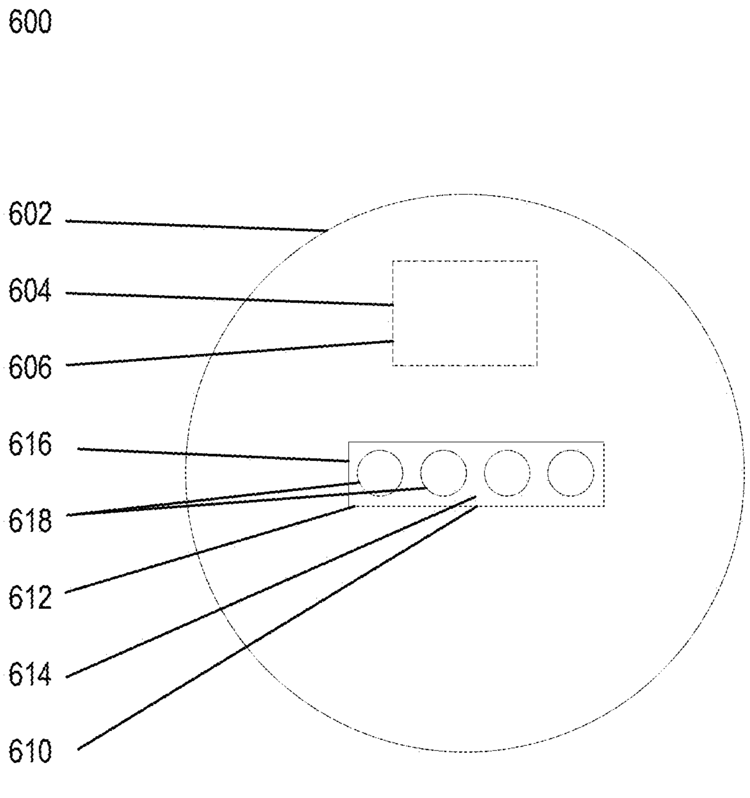
FIG. 6 illustrates a physical cryptographic token, according to some embodiments.

Referring now to FIG. 6, a physical cryptographic token 600 is illustrated, according to some embodiments. In this example, a passive identifier device 604 is enclosed by the substrate 602, e.g., by an additive manufacturing process. In this example, the passive identifier device 604 includes an RFID circuit 606. In this example, wherein causing an RFID transceiver of the token authentication device to transmit an electromagnetic authentication signal proximate the RFID circuit causes the RFID circuit to transmit an electromagnetic signal comprising the token identifier to the token authentication device.

In this example, the token 600 further includes a two-factor authentication device 610 for providing a visual indication 612 of a two-factor authentication code 614. In this example, the two-factor authentication device 610 comprises a Light Emitting Diode (LED) device 616, and wherein the visual indication 612 comprises a unique multi-color light array 618. In some examples, the two-factor authentication device 610 or other electronic display device, such as a display device displaying a QR code, may be equipped with a sensor that activates the device 610 or other display device in response to the token being in physical proximity to a token management device, in order to avoid unnecessary public display of one or more codes, and/or to conserve power.

In some examples, a token management device similar to the token management device 500 of FIG. 5 may include a token authentication device that includes an RFID transceiver to transmit an electromagnetic authentication signal proximate the RFID circuit 606 to causes the RFID circuit 606 to transmit an electromagnetic signal comprising the token identifier to the token authentication device. In some examples, printing the physical cryptographic token 600, e.g., using an additive printing device similar to the additive printing device 514 of FIG. 5, may include printing the substrate 602 around the RFID circuit 606.

Figure 7:
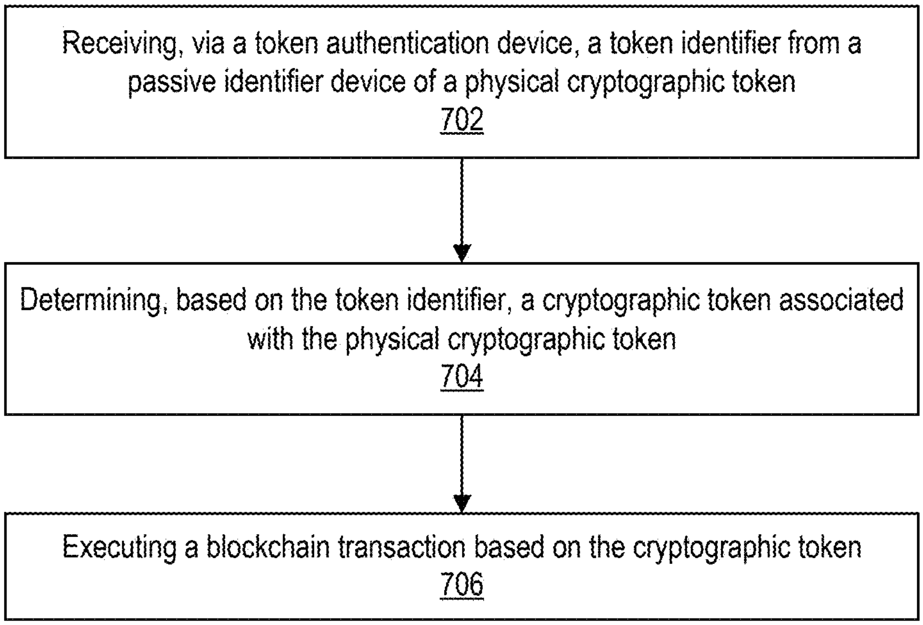
FIG. 7 is a flowchart illustrating operations of systems/methods of managing cryptographic tokens associated with token identifiers of physical cryptographic tokens, according to some embodiments.

FIG. 7 is a flowchart illustrating operations 700 of operations of systems/methods of authenticating a physical cryptographic token, according to some embodiments. The operations 700 may include receiving, via a token authentication device, a token identifier from a passive identifier device of a physical cryptographic token (Block 702). The operations 700 may further include determining, based on the token identifier, a cryptographic token associated with the physical cryptographic token (Block 704). The operations 700 may further include executing a blockchain transaction based on the cryptographic token (Block 706).

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A physical cryptographic token associated with a casino comprising:

a substrate;

a passive identifier device for passively providing a token identifier associated with the physical cryptographic token to a token authentication device, wherein the passive identifier device includes a three-dimensional structure comprising a machine-readable three-dimensional code formed by an additive manufacturing process; and a modified layer additively printed by additive manufacturing on the three-dimensional structure of the physical cryptographic token, wherein the modified layer is purchased by an owner of the physical cryptographic token during a cashout operation of an electronic gaming machine.

2. The physical cryptographic token of claim 1, wherein positioning the three-dimensional structure on a multi-touch sensor device of a token authentication device causes the token authentication device to read the three-dimensional code and determine the token identifier based on the three-dimensional code.

3. The physical cryptographic token of claim 1, wherein the substrate and the three-dimensional structure are formed by an additive manufacturing process.

4. The physical cryptographic token of claim 1, wherein the passive identifier device comprises a Radio-Frequency Identification (RFID) circuit, and wherein causing an RFID transceiver of the token authentication device to transmit an electromagnetic authentication signal proximate the RFID circuit causes the RFID circuit to transmit an electromagnetic signal comprising the token identifier to the token authentication device.

5. The physical cryptographic token of claim 4, wherein the substrate is formed by an additive manufacturing process, wherein the substrate encloses the RFID circuit.

6. The physical cryptographic token of claim 1, further comprising:

a two-factor authentication device for providing a visual indication of a two-factor authentication code.

7. The physical cryptographic token of claim 6, wherein the two-factor authentication device comprises a display device, and wherein the visual indication comprises an alphanumeric code displayed by the display device.

8. The physical cryptographic token of claim 6, wherein the two-factor authentication device comprises a Light Emitting Diode (LED) device, and wherein the visual indication comprises a unique multi-color light array.

9. A cryptographic token management device associated with a casino comprising:

a token authentication device for receiving a token identifier from a passive identifier device of a physical cryptographic token, wherein the token authentication device authenticates the physical cryptographic token based on the token identifier, wherein the passive identifier device includes a three-dimensional structure comprising a machine-readable three-dimensional code formed by an additive manufacturing process; and wherein the physical cryptographic token comprises a modified layer additively printed by additive manufacturing on the three-dimensional structure of the physical cryptographic token, wherein the modified layer is purchased by an owner of the physical cryptographic token during a cashout operation of an electronic gaming machine;

a token management interface for managing cryptographic tokens associated with token identifiers of physical cryptographic tokens; and a token dispenser device for dispensing a second physical cryptographic token associated with a second token identifier.

10. The cryptographic token management device of claim 9, further comprising a processor circuit; and a memory storing machine-readable instructions that, when executed by the processor circuit, cause the processor circuit to:

receive, via the token authentication device, a third token identifier from a passive identifier device of a third physical cryptographic token;

determine, based on the third token identifier, a cryptographic token associated with the third physical cryptographic token; and execute a blockchain transaction based on the cryptographic token.

11. The cryptographic token management device of claim 9, wherein the token authentication device comprises a multi-touch sensor device to detect the three-dimensional structure of the physical cryptographic token positioned on the sensor device and determine the token identifier based on the detected three-dimensional structure.

12. The cryptographic token management device of claim 9, wherein the token authentication device comprises an optical sensor device to detect a printed code on the physical cryptographic token and determine the token identifier based on the detected printed code.

13. The cryptographic token management device of claim 9, wherein the token management interface comprises an optical sensor device to detect two-factor authentication information being displayed by the physical cryptographic token to authenticate the physical cryptographic token.

14. The cryptographic token management device of claim 9, wherein the token authentication device comprises an RFID transceiver to transmit an electromagnetic authentication signal proximate an RFID circuit of the cryptographic token to causes the RFID circuit to transmit an electromagnetic signal comprising the token identifier to the token authentication device.

15. The cryptographic token management device of claim 9, wherein the token management interface comprises a display device to display information associated with the physical cryptographic token to a user.

16. The cryptographic token management device of claim 9, wherein the token management interface comprises an input device to input two-factor authentication information obtained from the physical cryptographic token to authenticate the physical cryptographic token.

17. The cryptographic token management device of claim 9, further comprising an additive printing device to print the physical cryptographic token based on a third token identifier associated with a cryptographic token.

18. The cryptographic token management device of claim 17, wherein printing the physical cryptographic token comprises printing a substrate and the three-dimensional structure comprising the machine-readable three-dimensional code associated with the token identifier.

19. The cryptographic token management device of claim 17, wherein printing the physical cryptographic token comprises printing a substrate around an RFID circuit, wherein transmission of an electromagnetic authentication signal proximate the RFID circuit causes the RFID circuit to an electromagnetic signal comprising the token identifier to the token authentication device.

* * * * *